United States Patent [19]

Kram

[11] Patent Number: 5,370,432
[45] Date of Patent: Dec. 6, 1994

[54] CAN PICK-UP TOOL

[76] Inventor: Edward W. Kram, EWK 34649 Roanoke St. N.W., Cambridge, Minn. 55008

[21] Appl. No.: 219,933

[22] Filed: Mar. 30, 1994

[51] Int. Cl.$^5$ .............................................. B25J 1/00
[52] U.S. Cl. .................................. 294/19.1; 294/115
[58] Field of Search ................... 294/1.4, 11, 16, 19.1, 294/19.3, 22, 28, 31.1, 50.8, 100, 115–117

[56] References Cited

U.S. PATENT DOCUMENTS

| | | | |
|---|---|---|---|
| 405,001 | 6/1889 | Barton | 294/115 |
| 1,018,065 | 2/1912 | Marble | 294/115 X |
| 1,415,143 | 5/1922 | Briddell | 294/115 |
| 1,592,286 | 7/1926 | Rymarz | 294/115 X |
| 2,482,576 | 9/1949 | Comstock | 294/115 X |
| 3,527,492 | 9/1970 | Hollis | 294/19.1 |
| 3,844,291 | 10/1974 | Moen . | |
| 4,005,897 | 2/1977 | Smith | 294/19.1 X |
| 4,467,802 | 8/1984 | Maslanka . | |
| 4,894,913 | 1/1990 | Ladin . | |
| 4,961,716 | 10/1990 | Hippely et al. . | |
| 4,994,079 | 2/1991 | Genese et al. . | |

Primary Examiner—Johnny D. Cherry

[57] ABSTRACT

A tool structure includes an elongate frame member having a forward end and a rear end, with the forward end pivotally mounting a plurality of jaws relative to the forward end, and the frame including tubular slide legs, each having a resilient connection relative to one of the jaws such that a sliding of the slide legs towards a rear end of the frame effects opening of the jaws permitting their securement of a can for lifting.

2 Claims, 2 Drawing Sheets

CAN PICK-UP TOOL

BACKGROUND OF THE INVENTION

1. Field of the Invention

The field of invention relates to pick-up tool structure, and more particularly pertains to a new can pick-up tool wherein the same is arranged to permit a lifting of cans for their subsequent recycling and the like.

2. Description of the Prior Art

Various pick-up or gripping tools are disclosed in the following U.S. Pat. Nos: 4,961,716; 4,994,079; 4,467,802; 4,894,913 and 3,844,291.

Thus, while various pick-up tools are available in the prior art, the instant invention is addressed to overcome deficiencies of the prior art by providing for a tool structure of convenient and efficient structure arranged for ease of use and in this respect, the present invention substantially fulfills this need.

SUMMARY OF THE INVENTION

In view of the disadvantages inherent in the known types of pick-up tool structure now present in the prior art, the present invention provides a can pick-up tool including cooperative jaws displaced, including resilient elastomeric link members.

To attain this, the present invention provides a tool structure which includes an elongate frame member having a forward end and a rear end, with the forward end pivotally mounting a plurality of jaws relative to the forward end, and the frame including tubular slide legs, each having a resilient connection relative to one of the jaws such that a sliding of the slide legs towards a rear end of the frame effects opening of the jaws permitting their securement of a can for lifting.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is an object of the present invention to provide a new can pick-up tool which may be easily and efficiently manufactured and marketed.

It is a further object of the present invention to provide a new can pick-up tool which is of a durable and reliable construction.

An even further object of the present invention is to provide a new can pick-up tool which is susceptible of a low cost of manufacture with regard to both materials and labor, and which accordingly is then susceptible of low prices of sale to the consuming public, thereby making such can pick-up tools economically available to the buying public.

Still yet another object of the present invention is to provide a new can pick-up tool which provides in the apparatuses and methods of the prior art some of the advantages thereof, while simultaneously overcoming some of the disadvantages normally associated therewith.

Even still yet another object of the present invention is to provide a new can pick-up tool which provides a tool structure including an elongate frame member having a forward end and a rear end, with the forward end pivotally mounting a plurality of jaws relative to the forward end, and the frame including tubular slide legs, each having a resilient connection relative to one of the jaws such that a sliding of the slide legs towards a rear end of the frame effects opening of the jaws permitting their securement of a can for lifting.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
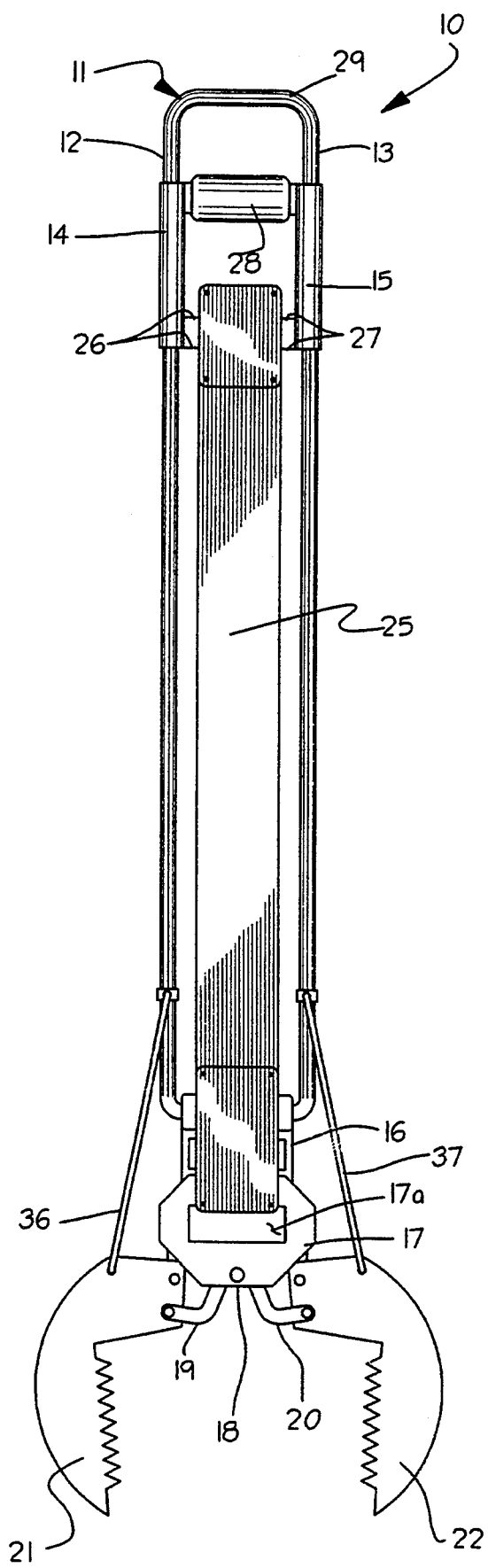
FIG. 1 is an orthographic top view of the invention with the jaws in a spaced second position.

With reference now to the drawings, and in particular to FIGS. 1-4 thereof, a new can pick-up tool embodying the principles and concepts of the present invention and generally designated by the reference numeral 10 will be described.

More specifically, the can pick-up tool 10 of the instant invention comprises an elongate tubular frame 11 having a forward end spaced from a rear end, with respective first and second tubular legs 12 and 13 arranged in a parallel coextensive relationship of the frame 11. A first slide tube 14 is slidably mounted upon the first leg 12, with the second slide tube 15 slidably mounted along the second leg 13. A mounting plate 16 is fixedly secured to the frame 11 at a frame forward end, with the mounting plate defining first and second pivot mounts 16a and 16b to which a first jaw 21 and a second jaw 22, respectively, are pivotally mounted.

Figure 2:
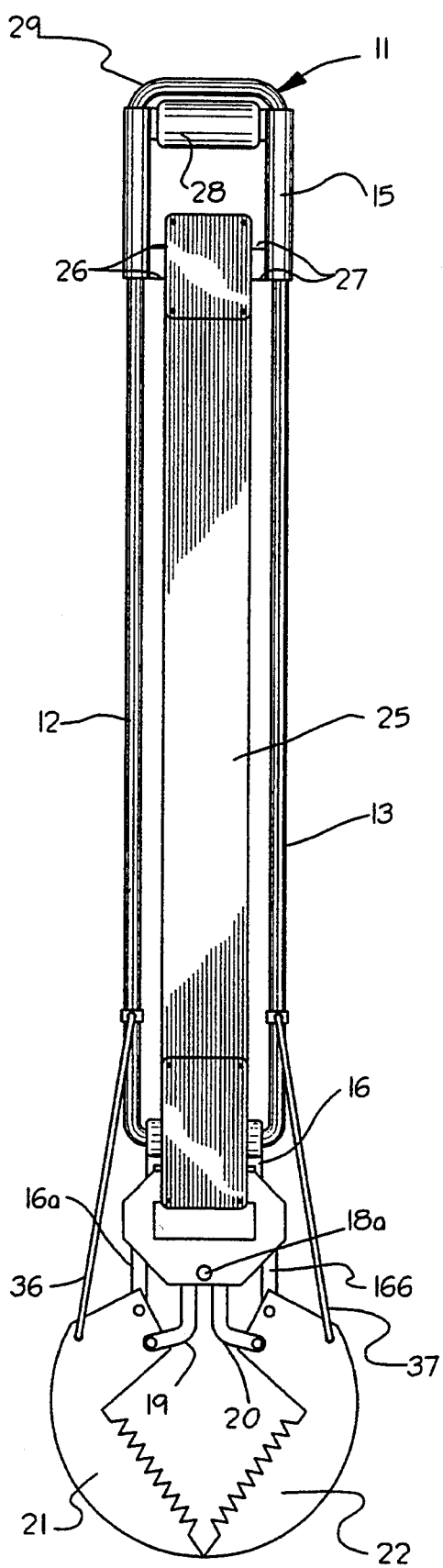
FIG. 2 is an orthographic top view of the invention with the jaws in a cooperative first position.
Figure 3:
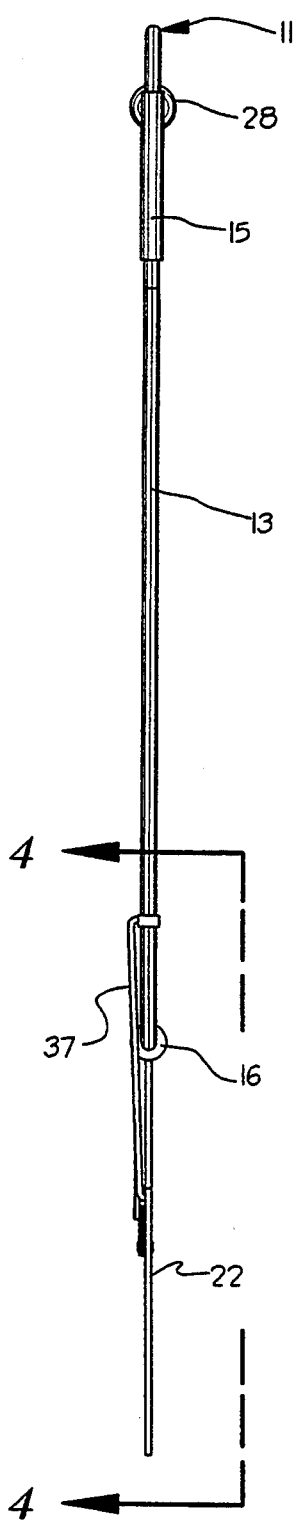
FIG. 3 is an orthographic side view of the invention.
Figure 4:
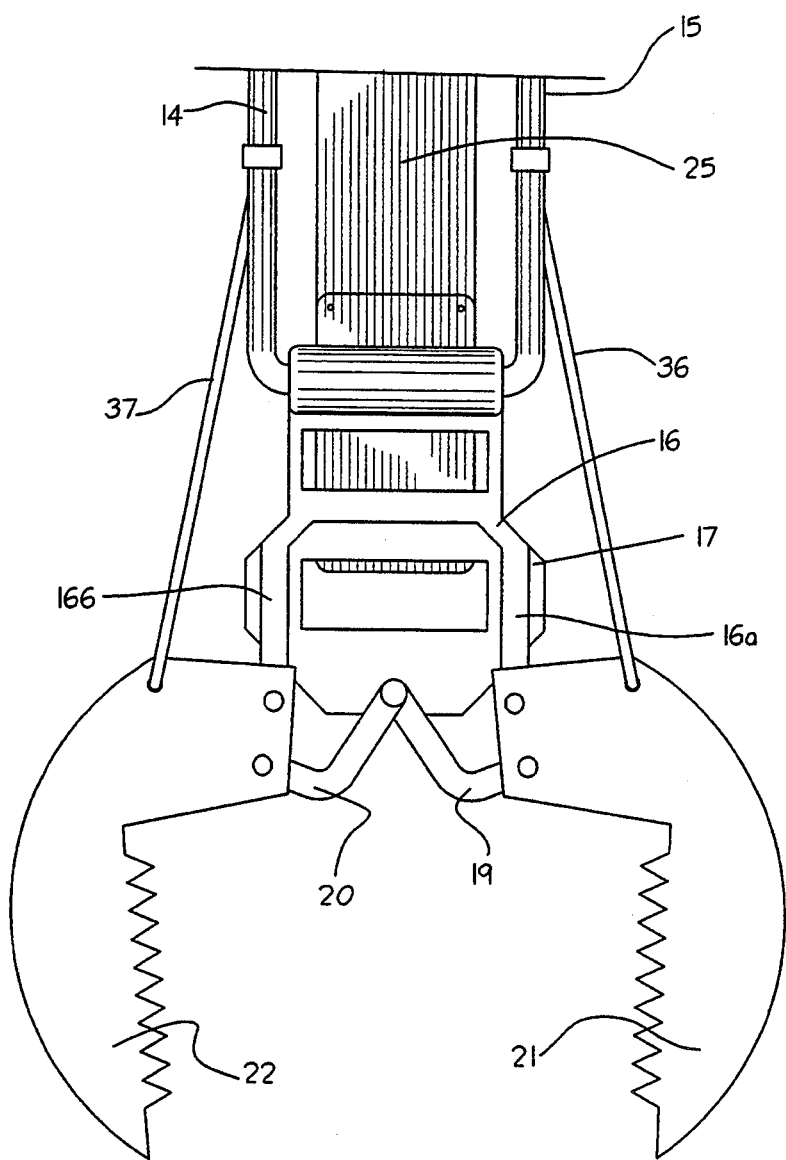
FIG. 4 is an enlarged orthographic view of the jaw structure.

A web mounting plate 17 having a web slot 17a directed therethrough is pivotally mounted by a pivot pin 18a to first and second pivot links 19 and 20, which are similarly pivotally coupled to the respective first and second jaws 21 and 22. To bias the jaws 21 and 22 into the open or second position illustrated in FIG. 1, a first elastomeric jaw link 36 is fixedly secured to both the first leg 12 and the first jaw 21. In a similar manner, a second elastomeric jaw link extends between the second leg 13 and the second jaw 22. To close the jaws 21 and 22 into the first position for gripping cans or other refuse, a connecting web 25 extends from the slot 17a to respective first and second connecting springs 26 and 27 which cooperate to mount the connecting web 25 to the respective first and second slide tubes 14 and 15 permitting lateral displacement of the slide tubes relative to the connecting web. The slide tubes 14 and 15 terminate in a connecting handle 28 at a rearward distal end of the slide tubes with the connecting handle being positioned for abutment with the frame connecting leg 29 in a retracted orientation of the slide tube structure, as shown in FIG. 2.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A can pick-up tool comprising:
   an elongate tubular frame having a forward end spaced from a rear end with respective first and second tubular legs arranged in a parallel, coextensive relationship;
   a first slide tube slidably mounted upon the first leg; a second slide tube slidably mounted upon the second leg;
   a mounting plate fixedly secured to the frame at said forward end, said mounting plate defining first and second pivot mounts;
   a first jaw pivotally mounted to said first pivot mount; a second jaw pivotally mounted to said second pivot mount;
   a web mounting plate having a web slot directed therethrough;
   a first pivot link pivotally mounted to said web mounting plate, the first pivot link further being pivotally mounted to said first jaw; a second pivot link pivotally mounted to said web mounting plate, the second pivot link further being pivotally mounted to said second jaw;
   a connecting web extending from the slot and mounted to both said first and second slide tubes;
   a handle mounted to both said first and second slide tubes; and,
   means for biasing said jaws into an open position.

2. The can pick-up tool of claim 1, wherein said means comprises a first elastomeric jaw link fixedly secured to both the first leg and the first jaw, and a second elastomeric jaw link fixedly secured to both the second leg and the second jaw.

* * * * *